(12) United States Patent
Erol et al.

(10) Patent No.: US 8,373,905 B2
(45) Date of Patent: *Feb. 12, 2013

(54) SEMANTIC CLASSIFICATION AND ENHANCEMENT PROCESSING OF IMAGES FOR PRINTING APPLICATIONS

(75) Inventors: Berna Erol, San Jose, CA (US);
Jonathan J. Hull, San Carlos, CA (US);
Dar-Shyang Lee, Union City, CA (US);
Gregory J. Wolff, Palo Alto, CA (US)

(73) Assignee: Ricoh Co., Ltd., Tokyo (JP)

( * ) Notice: Subject to any disclaimer, the term of this patent is extended or adjusted under 35 U.S.C. 154(b) by 147 days.

This patent is subject to a terminal disclaimer.

(21) Appl. No.: 12/334,303

(22) Filed: Dec. 12, 2008

(65) Prior Publication Data

US 2009/0092322 A1  Apr. 9, 2009

Related U.S. Application Data

(63) Continuation of application No. 11/031,516, filed on Jan. 7, 2005, now Pat. No. 7,505,178, which is a continuation-in-part of application No. 10/813,950, filed on Mar. 30, 2004, now Pat. No. 7,424,129.

(60) Provisional application No. 60/506,303, filed on Sep. 25, 2003, provisional application No. 60/506,302, filed on Sep. 25, 2003.

(51) Int. Cl.
G06F 3/12 (2006.01)
G06F 15/00 (2006.01)

(52) U.S. Cl. .................. 358/3.27; 358/1.9; 358/1.13

(58) Field of Classification Search ............ 358/1.1, 358/1.9, 2.1, 3.24, 3.27, 1.13, 1.15, 1.18, 358/448, 462; 382/224, 228, 229, 254
See application file for complete search history.

(56) References Cited

U.S. PATENT DOCUMENTS

| 4,133,007 A | 1/1979 | Wessler et al. |
| 4,205,780 A | 6/1980 | Burns et al. |
| 4,437,378 A | 3/1984 | Ishida et al. |
| 4,619,522 A | 10/1986 | Imai |
| 4,635,132 A | 1/1987 | Nakamura |
| 4,703,366 A | 10/1987 | Kobori et al. |
| 4,734,898 A | 3/1988 | Morinaga |
| 4,754,485 A | 6/1988 | Klatt |
| 4,807,186 A | 2/1989 | Ohnishi et al. |
| 4,831,610 A | 5/1989 | Hoda et al. |
| 4,881,135 A | 11/1989 | Heilweil |

(Continued)

FOREIGN PATENT DOCUMENTS

| CA | 2386829 | 11/2002 |
| CN | 1352765 A | 6/2002 |

(Continued)

OTHER PUBLICATIONS

Ueno, M. et al., "Multimedia Information EPG and its Use: A Proposal of Multimedia EPG", Proceedings of the Institute of Electronics, Information and Communication Engineers (IEICE) General Conference, Basic/Boundary, Mar. 6, 1998, pp. 357 (7 pages including translation).

(Continued)

*Primary Examiner* — Thomas D Lee
(74) *Attorney, Agent, or Firm* — Patent Law Works LLP (57) ABSTRACT

A printing system enables the printing of enhanced documents using a semantic classification scheme. A printing system receives an image to be printed. The system classifies the image according to the semantic classification scheme and, based on this classification, performs enhancement processing on the image. Depending on the desired application, the printing system may recognize and classify any number of image types and may then perform various enhancement processing functions on the image, where the type of enhancement processing performed is based on the classification of the image.

18 Claims, 7 Drawing Sheets

U.S. PATENT DOCUMENTS

| | | | |
|---|---|---|---|
| 4,907,973 A | 3/1990 | Hon et al. | |
| 4,998,215 A | 3/1991 | Black et al. | |
| 5,010,498 A | 4/1991 | Miyata | |
| 5,059,126 A | 10/1991 | Kimball | |
| 5,091,948 A | 2/1992 | Kametani | |
| 5,093,730 A | 3/1992 | Ishii et al. | |
| 5,111,285 A | 5/1992 | Fujita et al. | |
| 5,115,967 A | 5/1992 | Wedekind | |
| 5,136,563 A | 8/1992 | Takemasa et al. | |
| 5,170,935 A | 12/1992 | Federspiel et al. | |
| 5,220,649 A | 6/1993 | Forcier | |
| 5,231,698 A | 7/1993 | Forcier | |
| 5,237,648 A | 8/1993 | Mills et al. | |
| 5,270,989 A | 12/1993 | Kimura | |
| 5,343,251 A | 8/1994 | Nafeh | |
| 5,386,510 A | 1/1995 | Jacobs | |
| 5,428,555 A | 6/1995 | Starkey et al. | |
| 5,432,532 A | 7/1995 | Mochimaru et al. | |
| 5,436,792 A | 7/1995 | Leman et al. | |
| 5,438,426 A | 8/1995 | Miake et al. | |
| 5,444,476 A | 8/1995 | Conway et al. | |
| 5,479,600 A | 12/1995 | Wroblewski et al. | |
| 5,480,306 A | 1/1996 | Liu | |
| 5,485,554 A | 1/1996 | Lowitz et al. | |
| 5,488,423 A | 1/1996 | Walkingshaw et al. | |
| 5,493,409 A | 2/1996 | Maeda et al. | |
| 5,524,085 A | 6/1996 | Bellucco et al. | |
| 5,566,271 A | 10/1996 | Tomitsuka et al. | |
| 5,568,406 A | 10/1996 | Gerber | |
| 5,572,651 A | 11/1996 | Weber et al. | |
| 5,576,950 A | 11/1996 | Tonomura et al. | |
| 5,581,366 A | 12/1996 | Merchant et al. | |
| 5,590,257 A | 12/1996 | Forcier | |
| 5,596,698 A | 1/1997 | Morgan | |
| 5,617,138 A | 4/1997 | Ito et al. | |
| 5,624,265 A | 4/1997 | Redford et al. | |
| 5,627,936 A | 5/1997 | Prasad et al. | |
| 5,628,684 A | 5/1997 | Bouedec | |
| 5,633,723 A | 5/1997 | Sugiyama et al. | |
| 5,640,193 A | 6/1997 | Wellner | |
| 5,661,506 A | 8/1997 | Lazzouni et al. | |
| 5,661,783 A | 8/1997 | Assis | |
| 5,682,330 A | 10/1997 | Seaman et al. | |
| 5,682,540 A | 10/1997 | Klotz, Jr. et al. | |
| 5,690,496 A | 11/1997 | Kennedy | |
| 5,706,097 A | 1/1998 | Schelling et al. | |
| 5,717,841 A | 2/1998 | Farrell et al. | |
| 5,721,883 A | 2/1998 | Katsuo et al. | |
| 5,729,665 A | 3/1998 | Gauthier | |
| 5,749,735 A | 5/1998 | Redford et al. | |
| 5,757,897 A | 5/1998 | LaBarbera et al. | |
| 5,761,380 A | 6/1998 | Lewis et al. | |
| 5,764,235 A | 6/1998 | Hunt et al. | |
| 5,764,368 A | 6/1998 | Shibaki et al. | |
| 5,774,260 A | 6/1998 | Petitto et al. | |
| 5,793,869 A | 8/1998 | Claflin, Jr. | |
| 5,804,803 A | 9/1998 | Cragun et al. | |
| 5,845,144 A | 12/1998 | Tateyama et al. | |
| 5,877,764 A | 3/1999 | Feitelson et al. | |
| 5,884,056 A | 3/1999 | Steele | |
| 5,903,538 A | 5/1999 | Fujita et al. | |
| 5,936,542 A | 8/1999 | Kleinrock et al. | |
| 5,938,727 A | 8/1999 | Ikeda | |
| 5,940,776 A | 8/1999 | Baron et al. | |
| 5,941,936 A | 8/1999 | Taylor | |
| 5,945,998 A | 8/1999 | Eick | |
| 5,949,879 A | 9/1999 | Berson et al. | |
| 5,962,839 A | 10/1999 | Eskildsen | |
| 5,974,189 A * | 10/1999 | Nicponski | 382/254 |
| 5,987,226 A | 11/1999 | Ishikawa et al. | |
| 5,995,553 A | 11/1999 | Crandall et al. | |
| 5,999,173 A | 12/1999 | Ubillos | |
| 6,000,030 A | 12/1999 | Steinberg et al. | |
| 6,006,241 A | 12/1999 | Purnaveja et al. | |
| 6,020,916 A | 2/2000 | Gerszberg et al. | |
| 6,038,567 A | 3/2000 | Young | |
| 6,043,904 A | 3/2000 | Nickerson | |
| 6,046,718 A | 4/2000 | Suzuki et al. | |
| 6,076,733 A | 6/2000 | Wilz, Sr. et al. | |
| 6,076,734 A | 6/2000 | Dougherty et al. | |
| 6,081,261 A | 6/2000 | Wolff et al. | |
| 6,098,106 A | 8/2000 | Philyaw et al. | |
| 6,106,457 A | 8/2000 | Perkins et al. | |
| 6,108,656 A | 8/2000 | Durst et al. | |
| 6,111,567 A | 8/2000 | Savchenko et al. | |
| 6,115,718 A | 9/2000 | Huberman et al. | |
| 6,118,888 A | 9/2000 | Chino et al. | |
| 6,123,258 A | 9/2000 | Iida | |
| 6,125,229 A | 9/2000 | Dimitrova et al. | |
| 6,138,151 A | 10/2000 | Reber et al. | |
| 6,141,001 A | 10/2000 | Baleh | |
| 6,148,094 A | 11/2000 | Kinsella | |
| 6,152,369 A | 11/2000 | Wilz, Sr. et al. | |
| 6,153,667 A | 11/2000 | Howald | |
| 6,167,033 A | 12/2000 | Chang et al. | |
| 6,170,007 B1 | 1/2001 | Venkatraman et al. | |
| 6,175,489 B1 | 1/2001 | Markow et al. | |
| 6,189,009 B1 | 2/2001 | Stratigos et al. | |
| 6,193,658 B1 | 2/2001 | Wendelken et al. | |
| 6,195,068 B1 | 2/2001 | Suzuki et al. | |
| 6,199,042 B1 | 3/2001 | Kurzweil | |
| 6,230,189 B1 | 5/2001 | Sato et al. | |
| 6,256,638 B1 | 7/2001 | Dougherty et al. | |
| 6,266,053 B1 | 7/2001 | French et al. | |
| 6,296,693 B1 | 10/2001 | McCarthy | |
| 6,297,812 B1 | 10/2001 | Ohara et al. | |
| 6,297,851 B1 | 10/2001 | Taubman et al. | |
| 6,298,145 B1 | 10/2001 | Zhang et al. | |
| 6,301,586 B1 | 10/2001 | Yang et al. | |
| 6,302,527 B1 | 10/2001 | Walker | |
| 6,307,956 B1 | 10/2001 | Black | |
| 6,308,887 B1 | 10/2001 | Korman et al. | |
| 6,330,976 B1 | 12/2001 | Dymetman et al. | |
| 6,360,057 B1 | 3/2002 | Tsumagari et al. | |
| 6,369,811 B1 | 4/2002 | Graham et al. | |
| 6,373,498 B1 | 4/2002 | Abgrall | |
| 6,373,585 B1 | 4/2002 | Mastie et al. | |
| 6,375,298 B2 | 4/2002 | Purcell et al. | |
| 6,378,070 B1 | 4/2002 | Chan et al. | |
| 6,381,614 B1 | 4/2002 | Barnett et al. | |
| 6,396,594 B1 | 5/2002 | French et al. | |
| 6,400,996 B1 | 6/2002 | Hoffberg et al. | |
| 6,417,435 B2 | 7/2002 | Chantzis et al. | |
| 6,421,738 B1 | 7/2002 | Ratan et al. | |
| 6,439,465 B1 | 8/2002 | Bloomberg | |
| 6,442,336 B1 | 8/2002 | Lemelson | |
| 6,452,615 B1 | 9/2002 | Chiu et al. | |
| 6,466,534 B2 | 10/2002 | Cundiff, Sr. | |
| 6,476,793 B1 | 11/2002 | Motoyama et al. | |
| 6,476,834 B1 | 11/2002 | Doval et al. | |
| 6,502,114 B1 | 12/2002 | Forcier | |
| D468,277 S | 1/2003 | Sugiyama | |
| 6,502,756 B1 | 1/2003 | Fåhraeus | |
| 6,504,620 B1 | 1/2003 | Kinjo | |
| 6,515,756 B1 | 2/2003 | Mastie et al. | |
| 6,519,360 B1 | 2/2003 | Tanaka | |
| 6,529,920 B1 | 3/2003 | Arons et al. | |
| 6,535,639 B1 | 3/2003 | Uchihachi et al. | |
| 6,544,294 B1 | 4/2003 | Greenfield et al. | |
| 6,552,743 B1 | 4/2003 | Rissman | |
| 6,556,241 B1 | 4/2003 | Yoshimura et al. | |
| 6,568,595 B1 | 5/2003 | Russell et al. | |
| 6,581,070 B1 | 6/2003 | Gibbon et al. | |
| 6,587,859 B2 | 7/2003 | Dougherty et al. | |
| 6,593,860 B2 | 7/2003 | Lai et al. | |
| 6,594,377 B1 | 7/2003 | Kim et al. | |
| 6,611,276 B1 | 8/2003 | Muratori et al. | |
| 6,611,622 B1 | 8/2003 | Krumm | |
| 6,611,628 B1 | 8/2003 | Sekiguchi et al. | |
| 6,625,334 B1 | 9/2003 | Shiota et al. | |
| 6,647,534 B1 | 11/2003 | Graham | |
| 6,647,535 B1 | 11/2003 | Bozdagi et al. | |
| 6,654,887 B2 | 11/2003 | Rhoads | |
| 6,665,092 B2 | 12/2003 | Reed | |
| 6,674,538 B2 | 1/2004 | Takahashi | |
| 6,678,389 B1 | 1/2004 | Sun et al. | |
| 6,687,383 B1 | 2/2004 | Kanevsky et al. | |

| | | | | | | |
|---|---|---|---|---|---|---|
| 6,700,566 B2 | 3/2004 | Shimoosawa et al. | 2002/0066782 A1 | 6/2002 | Swaminathan et al. | |
| 6,701,011 B1 | 3/2004 | Nakajima | 2002/0067503 A1 | 6/2002 | Hiatt | |
| 6,701,369 B1 | 3/2004 | Philyaw | 2002/0078149 A1 | 6/2002 | Chang et al. | |
| 6,724,494 B1 | 4/2004 | Danknick | 2002/0087530 A1 | 7/2002 | Smith et al. | |
| 6,728,466 B1 | 4/2004 | Tanaka | 2002/0087598 A1 | 7/2002 | Carro | |
| 6,745,234 B1 | 6/2004 | Philyaw et al. | 2002/0095501 A1 | 7/2002 | Chiloyan et al. | |
| 6,750,978 B1 | 6/2004 | Marggraff et al. | 2002/0099534 A1 | 7/2002 | Hegarty | |
| 6,753,883 B2 | 6/2004 | Schena et al. | 2002/0101343 A1 | 8/2002 | Patton | |
| 6,771,283 B2 | 8/2004 | Carro | 2002/0101513 A1 | 8/2002 | Halverson | |
| 6,772,947 B2 | 8/2004 | Shaw | 2002/0131071 A1 | 9/2002 | Parry | |
| 6,774,951 B2 | 8/2004 | Narushima | 2002/0131078 A1 | 9/2002 | Tsukinokizawa | |
| 6,775,651 B1 | 8/2004 | Lewis et al. | 2002/0134699 A1 | 9/2002 | Bradfield et al. | |
| 6,807,303 B1 | 10/2004 | Kim et al. | 2002/0135800 A1 | 9/2002 | Dutta | |
| 6,824,044 B1 | 11/2004 | Lapstun et al. | 2002/0137544 A1 | 9/2002 | Myojo | |
| 6,845,913 B2 | 1/2005 | Madding et al. | 2002/0140993 A1 | 10/2002 | Silverbrook | |
| 6,853,980 B2 | 2/2005 | Ying et al. | 2002/0159637 A1 | 10/2002 | Echigo et al. | |
| 6,856,415 B1 | 2/2005 | Simchik et al. | 2002/0165769 A1 | 11/2002 | Ogaki et al. | |
| 6,871,780 B2 | 3/2005 | Nygren et al. | 2002/0169849 A1 | 11/2002 | Schroath | |
| 6,877,134 B1 | 4/2005 | Fuller et al. | 2002/0171857 A1 | 11/2002 | Hisatomi et al. | |
| 6,883,162 B2 | 4/2005 | Jackson et al. | 2002/0185533 A1 | 12/2002 | Shieh et al. | |
| 6,886,750 B2 | 5/2005 | Rathus et al. | 2002/0199149 A1 | 12/2002 | Nagasaki et al. | |
| 6,892,193 B2 | 5/2005 | Bolle et al. | 2003/0002068 A1 | 1/2003 | Constantin et al. | |
| 6,898,709 B1 | 5/2005 | Teppler | 2003/0007776 A1 | 1/2003 | Kameyama et al. | |
| 6,904,168 B1 | 6/2005 | Steinberg et al. | 2003/0014615 A1 | 1/2003 | Lynggaard | |
| 6,904,451 B1 | 6/2005 | Orfitelli et al. | 2003/0024975 A1 | 2/2003 | Rajasekharan | |
| 6,923,721 B2 | 8/2005 | Luciano et al. | 2003/0025951 A1 | 2/2003 | Pollard et al. | |
| 6,931,594 B1 | 8/2005 | Jun | 2003/0038971 A1 | 2/2003 | Renda | |
| 6,938,202 B1 | 8/2005 | Matsubayashi et al. | 2003/0046241 A1 | 3/2003 | Toshikage et al. | |
| 6,946,672 B1 | 9/2005 | Lapstun et al. | 2003/0051214 A1 | 3/2003 | Graham et al. | |
| 6,950,623 B2 | 9/2005 | Brown et al. | 2003/0065925 A1 | 4/2003 | Shindo et al. | |
| 6,964,374 B1 | 11/2005 | Djuknic et al. | 2003/0076521 A1 | 4/2003 | Li et al. | |
| 6,966,495 B2 | 11/2005 | Lynggaard et al. | 2003/0084462 A1 | 5/2003 | Kubota et al. | |
| 6,983,482 B2 | 1/2006 | Morita et al. | 2003/0086720 A1 | 5/2003 | Song | |
| 7,000,193 B1 | 2/2006 | Impink, Jr. et al. | 2003/0088582 A1 | 5/2003 | Pflug | |
| 7,023,459 B2 | 4/2006 | Arndt et al. | 2003/0093384 A1 | 5/2003 | Durst et al. | |
| 7,031,965 B1 | 4/2006 | Moriya et al. | 2003/0110926 A1 | 6/2003 | Sitrick et al. | |
| 7,073,119 B2 | 7/2006 | Matsubayashi et al. | 2003/0117652 A1 | 6/2003 | Lapstun | |
| 7,075,676 B2 | 7/2006 | Owen | 2003/0121006 A1 | 6/2003 | Tabata et al. | |
| 7,079,278 B2 | 7/2006 | Sato | 2003/0128877 A1 * | 7/2003 | Nicponski | 382/224 |
| 7,089,156 B2 | 8/2006 | Takayasu et al. | 2003/0146927 A1 | 8/2003 | Crow et al. | |
| 7,089,420 B1 | 8/2006 | Durst et al. | 2003/0160898 A1 | 8/2003 | Baek et al. | |
| 7,092,568 B2 | 8/2006 | Eaton | 2003/0164898 A1 | 9/2003 | Imai | |
| 7,131,058 B1 | 10/2006 | Lapstun | 2003/0177240 A1 | 9/2003 | Gulko et al. | |
| 7,134,016 B1 | 11/2006 | Harris | 2003/0187642 A1 | 10/2003 | Ponceleon et al. | |
| 7,149,957 B2 | 12/2006 | Hull et al. | 2003/0218597 A1 | 11/2003 | Hodzic | |
| 7,151,613 B1 | 12/2006 | Ito | 2003/0220988 A1 | 11/2003 | Hymel | |
| 7,152,206 B1 | 12/2006 | Tsuruta | 2003/0231198 A1 | 12/2003 | Janevski | |
| 7,162,690 B2 | 1/2007 | Gupta et al. | 2004/0024643 A1 | 2/2004 | Pollock et al. | |
| 7,174,151 B2 | 2/2007 | Lynch et al. | 2004/0036842 A1 | 2/2004 | Tsai et al. | |
| 7,181,502 B2 | 2/2007 | Incertis | 2004/0039723 A1 | 2/2004 | Lee et al. | |
| 7,196,808 B2 | 3/2007 | Kofman et al. | 2004/0044894 A1 | 3/2004 | Lofgren et al. | |
| 7,215,436 B2 | 5/2007 | Hull et al. | 2004/0049681 A1 | 3/2004 | Diehl et al. | |
| 7,225,158 B2 | 5/2007 | Toshikage et al. | 2004/0064207 A1 | 4/2004 | Zacks et al. | |
| 7,228,492 B1 | 6/2007 | Graham | 2004/0118908 A1 | 6/2004 | Ando et al. | |
| 7,260,828 B2 | 8/2007 | Aratani et al. | 2004/0125402 A1 | 7/2004 | Kanai et al. | |
| 7,263,659 B2 | 8/2007 | Hull et al. | 2004/0128514 A1 | 7/2004 | Rhoads | |
| 7,263,671 B2 | 8/2007 | Hull et al. | 2004/0128613 A1 | 7/2004 | Sinisi | |
| 7,280,738 B2 | 10/2007 | Kauffman et al. | 2004/0143459 A1 | 7/2004 | Engleson et al. | |
| 7,298,512 B2 | 11/2007 | Reese et al. | 2004/0143602 A1 | 7/2004 | Ruiz et al. | |
| 7,305,620 B1 | 12/2007 | Nakajima et al. | 2004/0150627 A1 | 8/2004 | Luman et al. | |
| 7,313,808 B1 | 12/2007 | Gupta et al. | 2004/0156616 A1 | 8/2004 | Strub et al. | |
| 7,363,580 B2 | 4/2008 | Tabata et al. | 2004/0167695 A1 | 8/2004 | Carro | |
| 7,505,178 B2 * | 3/2009 | Erol et al. ............... 358/3.27 | 2004/0184064 A1 | 9/2004 | TaKeda et al. | |
| 7,647,555 B1 | 1/2010 | Wilcox et al. | 2004/0207876 A1 | 10/2004 | Aschenbrenner et al. | |
| 2001/0003846 A1 | 6/2001 | Rowe et al. | 2004/0215470 A1 | 10/2004 | Bodin | |
| 2001/0017714 A1 | 8/2001 | Komatsu et al. | 2004/0229195 A1 | 11/2004 | Marggraff et al. | |
| 2001/0037408 A1 | 11/2001 | Thrift et al. | 2004/0240541 A1 | 12/2004 | Chadwick et al. | |
| 2001/0052942 A1 | 12/2001 | MacCollum et al. | 2004/0240562 A1 | 12/2004 | Bargeron et al. | |
| 2002/0001101 A1 | 1/2002 | Hamura et al. | 2004/0249650 A1 | 12/2004 | Freedman et al. | |
| 2002/0004807 A1 | 1/2002 | Graham et al. | 2005/0038794 A1 | 2/2005 | Piersol | |
| 2002/0006100 A1 | 1/2002 | Cundiff, Sr. et al. | 2005/0064935 A1 | 3/2005 | Blanco | |
| 2002/0010641 A1 | 1/2002 | Stevens et al. | 2005/0068569 A1 | 3/2005 | Hull et al. | |
| 2002/0011518 A1 | 1/2002 | Goetz et al. | 2005/0068581 A1 | 3/2005 | Hull et al. | |
| 2002/0015066 A1 | 2/2002 | Siwinski et al. | 2005/0083413 A1 | 4/2005 | Reed et al. | |
| 2002/0019982 A1 | 2/2002 | Aratani et al. | 2005/0125717 A1 | 6/2005 | Segal et al. | |
| 2002/0023957 A1 | 2/2002 | Michaelis et al. | 2005/0149849 A1 | 7/2005 | Graham et al. | |
| 2002/0048224 A1 | 4/2002 | Dygert et al. | 2005/0213153 A1 | 9/2005 | Hull et al. | |
| 2002/0051010 A1 | 5/2002 | Jun et al. | 2005/0216838 A1 | 9/2005 | Graham | |
| 2002/0060748 A1 | 5/2002 | Aratani et al. | 2005/0216852 A1 | 9/2005 | Hull et al. | |

| | | | |
|---|---|---|---|
| 2005/0223309 | A1 | 10/2005 | Lee et al. |
| 2005/0225781 | A1 | 10/2005 | Koizumi |
| 2005/0262437 | A1 | 11/2005 | Patterson et al. |
| 2006/0013478 | A1 | 1/2006 | Ito et al. |
| 2006/0043193 | A1 | 3/2006 | Brock |
| 2006/0092450 | A1 | 5/2006 | Kanazawa et al. |
| 2006/0136343 | A1 | 6/2006 | Coley et al. |
| 2006/0171559 | A1 | 8/2006 | Rhoads |
| 2006/0250585 | A1 | 11/2006 | Anderson et al. |
| 2007/0033419 | A1 | 2/2007 | Kocher et al. |
| 2007/0065094 | A1 | 3/2007 | Chien et al. |
| 2007/0109397 | A1 | 5/2007 | Yuan et al. |
| 2007/0162858 | A1 | 7/2007 | Hurley et al. |
| 2007/0168426 | A1 | 7/2007 | Ludwig et al. |
| 2007/0234196 | A1 | 10/2007 | Nicol et al. |
| 2007/0268164 | A1 | 11/2007 | Lai et al. |
| 2008/0037043 | A1 | 2/2008 | Hull et al. |
| 2008/0246757 | A1 | 10/2008 | Ito |

FOREIGN PATENT DOCUMENTS

| | | |
|---|---|---|
| CN | 1097394 C | 12/2002 |
| EP | 0651556 | 5/1995 |
| EP | 0743613 | 11/1996 |
| EP | 1079313 A2 | 2/2001 |
| EP | 1133170 A2 | 9/2001 |
| JP | 60-046653 | 3/1985 |
| JP | 01-172900 | 7/1989 |
| JP | 04-225670 | 8/1992 |
| JP | 05-101484 | 4/1993 |
| JP | 06-124502 | 5/1994 |
| JP | 07-160445 | 6/1995 |
| JP | H07-284033 | 10/1995 |
| JP | 08-002015 | 1/1996 |
| JP | 08-69419 | 3/1996 |
| JP | 08-160985 | 6/1996 |
| JP | H09-037180 | 2/1997 |
| JP | H10-049761 | 2/1998 |
| JP | 10-126723 | 5/1998 |
| JP | H11-341423 | 12/1999 |
| JP | 2000190575 | 7/2000 |
| JP | 2000352995 | 12/2000 |
| JP | 2001-228994 | 8/2001 |
| JP | 2001324988 | 11/2001 |
| JP | 2002178565 | 6/2002 |
| JP | 2002344636 | 11/2002 |
| JP | 2003005790 | 1/2003 |
| JP | 2003-87458 | 3/2003 |
| JP | 2003-513564 | 4/2003 |
| JP | 2003-514318 | 4/2003 |
| JP | 2003-177776 | 6/2003 |
| WO | WO9806098 | 2/1998 |
| WO | WO 99/18523 | 4/1999 |
| WO | WO0073875 | 12/2000 |
| WO | WO 02/082316 A1 | 10/2002 |

OTHER PUBLICATIONS

Boreczky, J. et al., "An Interactive Comic Book Presentation for Exploring Video," CHI Letters, Apr. 1-6, 2000, pp. 185-192, vol. 2, Issue 1.
Buchanan, M.C. et al., "Multimedia Documents as User Interfaces," INTERCHI '93, Amsterdam, The Netherlands, Apr. 24-29, 1993, pp. 527-528.
Harada, K. et al., "Anecdote: A Multimedia Storyboarding System with Seamless Authoring Support," ACM Multimedia '96, Boston, MA, 1996, pp. 341-351.
Mackay, W. et al., "Augmenting Reality: Adding Computational Dimensions to Paper," Communications of the ACM, Jul. 1993, pp. 96-97, vol. 36, No. 7.
Mackay, W. et al., "Video Mosaic: Laying Out Time in a Physical Space," Multimedia '94, San Francisco, CA, Oct. 1994, pp. 165-172.
Makedon, F. et al., "Multimedia Authoring, Development Environments and Digital Video Editing," Dartmouth College Technical Report, PCS-TR94-231, 2001, pp. 1-24.
Nelson, L. et al, "Palette: A Paper Interface for Giving Presentations," CHI '99, May 1999, pp. 1-8.
Roschelle, J. et al., "VideoNoter: A Productivity Tool for Video Data Analysis," Behavior Research Methods, Instruments & Computers, 1991, pp. 219-224, vol. 23, No. 2.
Tonomura, Y. et al., "VideMAP and VideoSpaceIcon," INTERCHI '93, Amsterdam, The Netherlands, Apr. 24-29, 1993, pp. 131-136 and 544.
Wellner, P., "Interacting with Paper on the DigitalDesk," Communications of the ACM, Jul. 1993, pp. 87-96, vol. 36, No. 7.
Japanese Office Action, Japanese Application No. 2004-278353, Aug. 11, 2009, 3 pages.
Groot, M., "Multimedia Projectors: A Key Component in the Classroom of the Future," T.H.E. Journal Online, Jun. 2002, pp. 1-4, [Online] [Retrieved on Jul. 1, 2002] Retrieved from the Internet<URL:http://www.thejournal.com/magazine/vault/A4056.cfm>.
Shelbourn, M., et al., "Multimedia in Construction Education: New Dimensions," Automation in Construction, 2001, pp. 265-274, vol. 10, Elsevier.
U.S. Appl. No. 10/814,842, filed Mar. 30, 2004, Hull et al.
U.S. Appl. No. 10/814,580, filed Mar. 30, 2004, Piersol et al.
U.S. Appl. No. 10/660,867, filed Sep. 12, 2003, Erol et al.
Arai, T. et al., "PaperLink: A Technique for Hyperlinking from Real Paper to Electronic Content," CHI 97, Atlanta, GA, Mar. 22-27, 1997, pp. 327-334.
ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.
Brown et al., "A Diary Study of Information Capture in Working Life," Proceedings of ACM CHI 2000 Conference on Human Factors in Computing Systems, 2000, pp. 438-445, vol. 1.
Chinese Application No. 2004100849823 Office Action, Jun. 1, 2007, 24 pages.
Chinese Application No. 2004100897988 Office Action, Apr. 6, 2007, 8 pages.
Communication Pursuant to Article 96(2) EPC, European Application No. 04255836.1, Jun. 11, 2007, 10 pages.
Configuring A Printer (NT), Oxford Computer Support [online] [Retrieved on Nov. 13, 2003] Retrieved from the Internet<URL: http://www.nox.ac.uk/cehoxford/ccs/facilities/printers/configrt.htm>.
Dimitrova, N. et al., "Applications of Video-Content Analysis and Retrieval," IEEE Multimedia, Jul.-Sep. 2002, pp. 42-55.
"DocumentMall Secure Document Management" [online], DocumentMall. retrieved on Mar. 9, 2004). Retrieved from the Internet <URL: http://www.documentmall.com>.
Dorai, C. et al., "End-to-End VideoText Recognition for Multimedia Content Analysis," IEEE, International Conference on Multimedia and Expo, Aug. 2001, pp. 601-604.
Erol, Berna et al., "Linking Multimedia Presentations With Their Symbolic Source Documents: Algorithm and Applications," ACM Multimedia '03, Nov. 2-8, 2003, pp. 498-507, Berkeley, CA.
Erol, Berna et al., "Prescient Paper: Multimedia Document Creation With Document Image Matching," 17th International Conference on Pattern Recognition, Aug. 2004, 4 pages, Cambridge, U.K.
Erol, Berna et al, "Retrieval of Presentation Recordings With Digital Camera Images," IEE Conference on Computer Vision and Pattern Recognition (CVPR), Jun. 27-Jul. 2, 2004, 2 pages, Washington, D.C.
European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.
Girgensohn, Andreas et al., "Time-Constrained Keyframe Selection Technique," Multimedia Tools and Applications (2000), vol. 11, pp. 347-358.
Gopal, S. et al., "Load Balancing in a Heterogeneous Computing Environment," Proceedings of the Thirty-First Hawaii International Conference on System Sciences, Jan. 6-9, 1998.
Graham, J. et al., "A Paper-Based Interface for Video Browsing and Retrieval," ICME '03, Jul. 6-9, 2003, pp. 749-752, vol. 2.
Graham, Jamey et al., "The Video Paper Multimedia Playback System," Proceedings of the 11th ACM International Conference on Multimedia (Nov. 2003), pp. 94-95.

Graham, J. et al., "Video Paper: A Paper-Based Interface for Skimming and Watching Video," ICCE '02, Jun. 18-20, 2002, pp. 214-215.

Gropp, W. et al., "Using MPI-Portable Programming with the Message Passing Interface," copyright 1999, pp. 35-42, second edition, MIT Press.

Hardman, L. et al, "Integrating the Amsterdam Hypermedia Model with the Standard Reference Model for Intelligent Multimedia Presentation Systems," Computer Standards & Interfaces, 1997, pp. 497-507, vol. 18.

Hecht, D.L., "Printed Embedded Data Graphical User Interfaces," Computer, Mar. 2001, pp. 47-55, vol. 34, Issue 3.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

Karasik, D. "Image Processing in Perl Graphic Applications," Google, Apr. 2, 2003, pp. 1-12.

Klemmer, S.R. et al., "Books with Voices: Paper Transcripts as a Tangible Interface to Oral Histories," CHI 2003, Fort Lauderdale, FL, Apr. 5-10, 2003, pp. 89-96.

"Kofax: Ascent Capture: Overview" [online] [Retrieved on Jan. 22, 2004]. Retrieved form the Internet: <URL"http://www.kofax.com/products/ascent/capture>.

Label Producer by Maxell, [online] [Retrieved on Nov. 11, 2003]. Retrieved from the Internet<URL: http://www.maxell.co.jp/products/consumer/rabel_card/>.

Lamming, M. et al., "Using Automatically Generated Descriptions of Human Activity to Index Multi-media Data," IEEE Multimedia Communications and Applications IEE Colloquium, Feb. 7, 1991, pp. 1-2.

Lauesen, S., "User Interface Design: A Software Engineering Perspective," 2005, 28 pages.

Lienhart, Rainer et al., "Localizing and Segmenting Text in Images and Videos," IEEE Transactions on Circuits and Systems for Video Technology, Apr. 2002, pp. 256-268, vol. 12, No. 4.

"Microsoft Powerpoint—Wikipedia, the free encyclopedia," Wikimedia Foundation, Inc., [online] [Retrieved on Nov. 7, 2006] Retrieved from the internet <URL:http://en.wikipedia.org/wiki/Microsoft_PowerPoint>.

Minami, K. et al., "Video Handling with Music and Speech Detection," IEEE Multimedia, Jul.-Sep. 1998, pp. 17-25.

Movie-PhotoPrint by Canon, [online] [Retrieved on Nov. 11, 2003]. Retrieved from the Internet<URL: http://cweb.canon.jp/hps/quide/rimless.html>.

Otsu, N., "A Threshold Selection method From Gray-Level Histograms," IEEE Transactions on Systems, Man and Cybernetics, Jan. 1979, pp. 62-66, vol. SMC-9, No. 1.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

"PostScript Language Document Structuring Conventions Specification", Version 3.0 (Sep. 25, 1992), Adobe Systems Incorporated.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk by Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.

Shahraray, B. et al, "Automated Authoring of Hypermedia Documents of Video Programs," ACM Multimedia '95 Electronic Proceedings, San Francisco, CA, Nov. 5-9, 1995, pp. 1-12.

Shahraray, B. et al., "Pictorial Transcripts: Multimedia Processing Applied to Digital Library Creation," IEEE, 1997, pp. 581-586.

Srihari, S.N. et al., "Name and Address Block Reader System for Tax Form Processing," IEEE, 1995, pp. 5-10.

Stifelman, L. et al., "The Audio Notebook," SIGCHI 2001, Mar. 31-Apr. 5, 2001, pp. 182-189, vol. 3, No. 1, Seattle, WA.

"Tasty FotoArt" [online], date unknown, Tague Technologies, Inc., [retrieved on Mar. 8, 3005]. Retrieved from the Internet: <URL: http//www.tastyfotoart.com>.

U.S. Appl. No. 10/814,932, filed Mar. 30, 2004.
U.S. Appl. No. 10/814,751, filed Mar. 30, 2004.
U.S. Appl. No. 10/813,847, filed Mar. 30, 2004.
U.S. Appl. No. 10/814,931, filed Mar. 30, 2004.
U.S. Appl. No. 10/814,948, filed Mar. 30, 2004.
U.S. Appl. No. 10/814,386, filed Mar. 30, 2004.
U.S. Appl. No. 10/814,700, filed Mar. 30, 2004.
U.S. Appl. No. 10/814,500, filed Mar. 30, 2004.
U.S. Appl. No. 10/814,845, filed Mar. 30, 2004.
U.S. Appl. No. 09/714,785, filed Nov. 15, 2000.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Japanese Office Action, Japanese Application No. 2004-278346, Feb. 16, 2010, 2 pages.

Japanese Office Action, Japanese Application No. 2004-278349, Feb. 2, 2010, 2 pages.

Tonomura, Y. et al., "Structured Video Computing," IEEE Multimedia, Sep. 1994, pp. 34-43, vol. 1, Issue 3.

Machine Translation of JP 10049761 by Mori et al., 9 pages.

Mulhern, P. et al., "Pivot Vector Space Approach for Audio-Video Mixing," IEEE Multimedia, Apr.-Jun. 2003, pp. 28-40, vol. 10, Issue 2.

Srinivasan, U. et al., "Multi-Modal Feature-Map: An Approach to Represent Digital Video Sequences," VISUAL '99, LNCS 1614, 1999, pp. 299-306, Springer-Verlag, Berlin, Germany.

United States Office Action, U.S. Appl. No. 10/814,844, Sep. 11, 2009, 23 pages.

European Search Report, Application No. EP 04255847.8-1247/1526442, 4 pages.

United States Office Action, U.S. Appl. No. 11/094,887, Jul. 21, 2010, 44 pages.

European Communication, EP Application No. 04 255 847.8, Sep. 21, 2010, 6 pages.

Japanese Office Action, Japanese Application No. JP2004-278356, Aug. 10, 2010, 4 pages.

Japanese Office Action, Japanese Application No. JP2004-278347, Aug. 31, 2010, 2 pages.

United States Notice of Allowance, U.S. Appl. No. 10/814,842, Aug. 18, 2010, 8 pages.

United States Notice of Allowance, U.S. Appl. No. 10/814,944, Aug. 23, 2010, 10 pages.

United States Office Action, U.S. Appl. No. 10/813,846, Oct. 6, 2010, 29 pages.

United States Office Action, U.S. Appl. No. 11/094,887, Jan. 6, 2011, 70 pages.

Japanese Office Action, Japanese Patent Application No. 2004-278346, Jan. 18, 2011, 2 pages.

United States Office Action, U.S. Appl. No. 10/813,846, Apr. 1, 2011, 32 pages.

United States Office Action, U.S. Appl. No. 11/094,887, Jul. 22, 2011, 21 pages.

United States Notice of Allowance, U.S. Appl. No. 10/813,846, Sep. 16, 2011, 10 pages.

European Office Action, European Patent Application No. 04 255 839.5, Jun. 17, 2011, 5 pages.

United States Notice of Allowance, U.S. Appl. No. 11/094,887, May 17, 2012, 14 pages.

* cited by examiner

SEMANTIC CLASSIFICATION AND ENHANCEMENT PROCESSING OF IMAGES FOR PRINTING APPLICATIONS

CROSS REFERENCE TO RELATED APPLICATIONS

This application is a continuation of U.S. application Ser. No. 11/031,516, filed Jan. 7, 2005, which is a continuation-in-part of co-pending U.S. application Ser. No. 10/813,950, filed Mar. 30, 2004, which claims the benefit of U.S. Provisional Application No. 60/506,303, filed Sep. 25, 2003, and U.S. Provisional Application No. 60/506,302, filed Sep. 25, 2003; each of which is incorporated by reference in its entirety.

BACKGROUND

1. Field of the Invention

This invention relates generally to printing, and in particular to printing systems that have functionality for classifying an image and performing enhancement processing thereon based on its classification to improve the printed result.

2. Background of the Invention

As digital cameras become more ubiquitous—especially those integrated into cellular phones—they play an increasingly important role in the capture and sharing of visual information in the workplace. In a meeting, for example, an attendee may use a digital camera to capture an image of the contents of a whiteboard, information on a set of slides, a business card, or a scene with other people. Workplace studies have shown that people would use a digital camera in the office to capture these kinds of images if a camera were available. See, e.g., Brown et al., "A diary study of information capture in working life," Proceedings of ACM CHI 2000 Conference on Human Factors in Computing Systems, vol. 1, p. 438-45 (2000). Accordingly, cameras and other image capture devices present a unique opportunity to increase workplace productivity.

But while many people in the workplace are apt to find uses for capturing images, fundamental limitations remain. For example, office workers generally have little time for classifying and organizing the images they capture. In addition, although capturing images in the workplace is relatively easy, improving those images for printing is not. The average office worker lacks the technical knowledge to apply the appropriate post-processing to an image before printing it to achieve a high quality printout. Moreover, the types of enhancements that should be applied to an image tend to vary depending on the semantic type of the image. For example, a digital picture of a whiteboard would have different enhancement needs than a digital picture of someone's business card. Accordingly, the task of enhancing an image varies by the image type, further complicating the enhancement process.

Some existing systems detect low-level features in images (e.g., contrast, darkness, or color) and automatically apply some type of image processing to improve the images before printing. However, these systems lack the ability to apply more meaningful post-processing to the images that is tailored for the particular semantic class of the image—rather than just on the low-level properties of the image. Because existing systems can at best detect only low-level features of an image, the types of post-processing they can perform is correspondingly limited to basic image processing, which may not be adequate to improve the quality of the image.

SUMMARY OF THE INVENTION

To satisfy the needs unmet by conventional technologies, a printing system enables enhancement processing of an image that is specially tailored for the image's type, as represented by a semantic classification of the image. Accordingly, an image received by a printing system is classified according to at least one semantic category. While various embodiments may include any number and variety of semantic classifications, in one example the classifications include: whiteboard images, business card images, document images, slide images, and regular images. Once the image's semantic category is identified, enhancement processing is applied to the image, where the type of enhancement processing applied is based on the image's semantic classification. The enhanced version of the image can then be prepared for printing and sent to a printing output system to generate a printed representation of the image. Due to the enhancement processing, this printed representation is improved over that which would result in the absence of enhancement processing.

In one embodiment, printing system for organizing images captured in an office environment includes an interface for receiving an image from an image capture device. After an image is received by the interface, a semantic classifier module coupled to the interface determines a semantic category for the image based at least in part on content within the image. Based on the semantic category into which the image was classified, an enhancement processing module enhances the image. In this way, the enhancement of the image can be specially tailored for different types of images. An output system receives the enhanced image from the enhancement processing module and prepares the enhanced image for printing. The image can then be printed on a printer coupled to or integrated with the output system, or the image may be delivered to a number of users for printing or viewing at a later time.

In another embodiment, the output system may select one or more print options for a printed output of the image based on the semantic category into which the image was classified. Such print options include, but are not limited to, a layout orientation, a paper source, or an ink selection. The printing system can make an intelligent guess about certain print options because it knows what type of image is to be printed. These options may be selected automatically before printing or set as defaults changeable by a user. Moreover, the set of default print options for each semantic class may be user specific, stored separately on each user's image capture device or together on a central preferences server.

DETAILED DESCRIPTION OF THE PREFERRED EMBODIMENTS

System Overview

Figure 1:
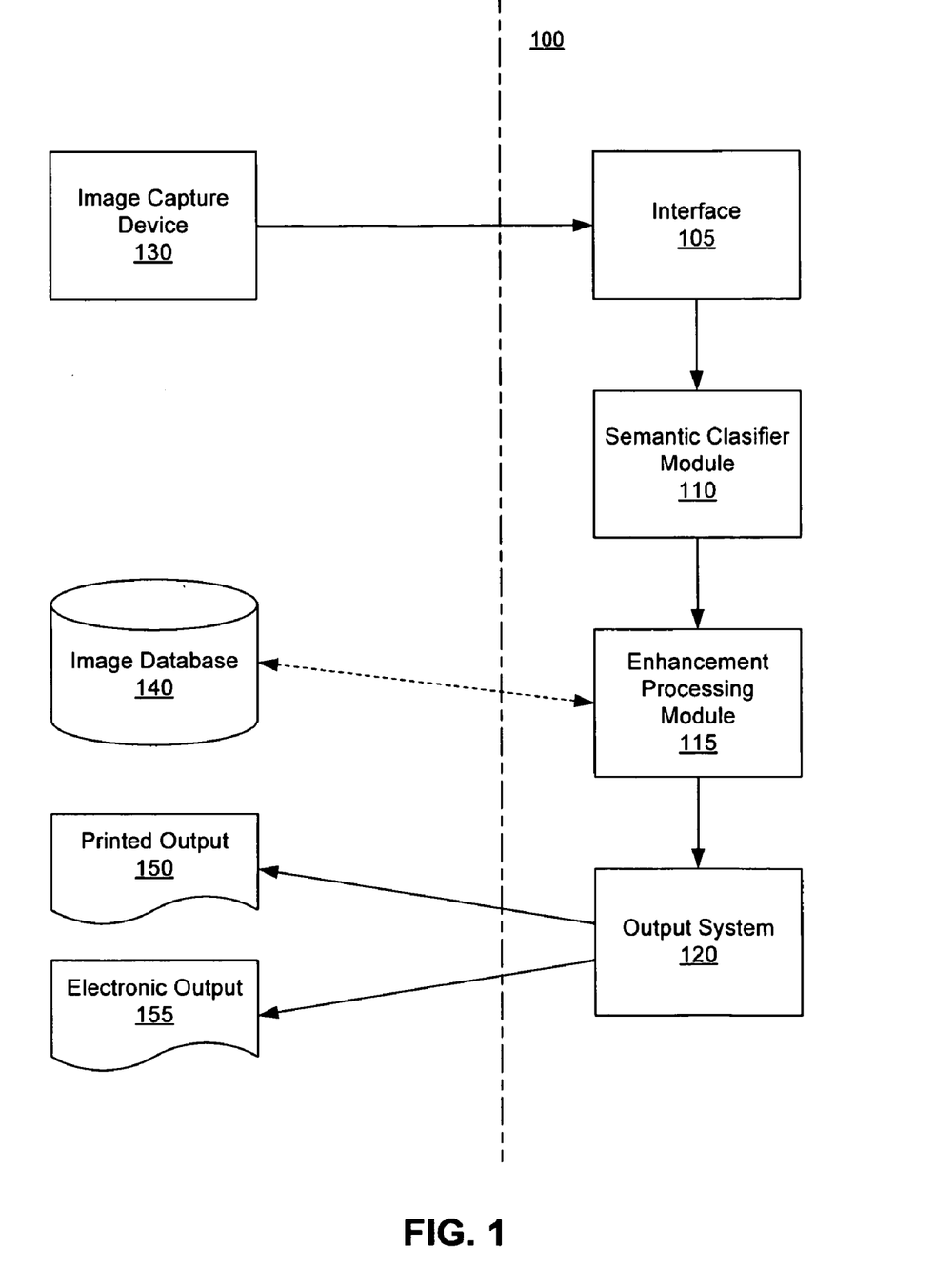
FIG. 1 is a flow diagram of a printing system in accordance with an embodiment of the invention.

Various embodiments of a printing system enable the printing of enhanced images using a semantic classification scheme. FIG. 1 is a high-level diagram of a flow process in which captured images are received, classified, and enhanced for printing, in accordance with one embodiment of the invention. A printing system 100 includes an interface 105, which can receive an image to be printed from an image capture device 130. The image capture device 130 may be a digital camera, a cellular phone with camera functionality, a video recorder, a video or still picture output device, a picture scanner, or any other device capable of producing an image suitable for printing. Accordingly, the printing system 100 may receive the image from any of a number of sources, including a computer, a network device, a portable device having media storage (e.g., a digital camera), a media broadcast, or any of a number of different sources. Depending on the source, the interface 105 of the printing system 100 includes appropriate hardware and software interfaces for communicating therewith, such as described in co-pending U.S. application Ser. No. 10/814,932, filed Mar. 30, 2004; co-pending U.S. application Ser. No. 10/814,751, filed Mar. 30, 2004; and co-pending U.S. application Ser. No. 10/813,847, filed Mar. 30, 2004; each of which is incorporated by reference in its entirety.

Once the interface 105 receives the captured image, the interface 105 provides the image to a semantic classification module 110. The semantic classification module 110 classifies the image according to a semantic classification scheme, which is described in more detail below. Unlike low-level attributes, which provide basic statistical information about an image, an image's semantic classification indicates what type of item the image represents. Although various categories of semantic classifications may be used, one set of semantic categories that may be useful in an office environment includes whiteboard images, business card images, document images, slide images, and regular images. In this example set, the semantic classification would differentiate images of business cards from images of a whiteboard.

Once the image is classified, the system 100 may then perform various enhancement processing functions on the image, where the type of enhancement processing performed is based on the classification of the image. Accordingly, the semantic classification module 110 provides the image and its semantic classification to an enhancement processing module 115. The enhancement processing module 115 performs enhancement processing on the image based on the semantic classification of the image. Generally, this enhancement processing improves the quality of the printed result, such as by increasing the readability of the printed output 150 and/or adding information thereto. Enhancement processing of various types of images is described in more detail below. To enhance an image for improving its readability, the enhancement processing module 115 may modify the image to be printed or replace the image altogether with an improved substitute. For example, if the image were determined to be a whiteboard image, a type of whiteboard cleanup enhancement processing may be used to make the image more readable and to eliminate any excess border region. In another example, if the image were determined to be a business card image, a database of business cards may be searched for a scanned copy of the business card and, if located, the scanned copy may be printed instead of the image thereof for a higher quality printout.

A number of embodiments of the printing system described herein thus demonstrate how a printing system can be configured in a limitless number of combinations to solve or address various needs that exist. In one embodiment, the printing system 100 comprised a multifunction printer as described in co-pending U.S. application Ser. No. 10/814,931, filed Mar. 30, 2004; a networked multifunction printer as described in co-pending U.S. application Ser. No. 10/814,948, filed Mar. 30, 2004; or a stand-alone multifunction printing system as described in co-pending U.S. application Ser. No. 10/814,386, filed Mar. 30, 2004; each of which is incorporated by reference in its entirety.

Although a general diagram is shown in FIG. 1 for the printing system 100, it will be understood that various embodiments of the system 100 described herein can be implemented in a variety of architectural configurations. For example, in addition to being a standalone appliance, the printing system 100 may be a peripheral to a meeting room portal or an office portal. A meeting room portal is an appliance in a meeting room that records meetings, for example the video and audio of a meeting. An office portal is an appliance that keeps a record of the visual and audible events that take place in an office. It will be appreciated that the classification and enhancement processing capabilities of the printing system 100 are a useful addition to either a meeting room portal or an office portal. Additionally, the printing system 100 may be integrated within an office copier.

Image Classification

Because the semantic classification of an image provides insight into the type of image, determining an image's classification entails more than computing low-level attributes of the image. In one embodiment, the classification is determined by analyzing the structure and contents of text regions in the image as well as analyzing color content within the image. By examining certain features in the image, an intelligent guess as to the type of image can be made. Although the following embodiment is described with respect to classifying images among an example set of semantic categories in an office environment (document images, whiteboard images, business card images, slide images, and regular images), it will be appreciated that the classification scheme may be applied to other groups of categories based on the same principles described herein.

In one embodiment, the semantic classification scheme uses feature extraction to isolate certain features in the image. One set of important features is the textual content of the image. Accordingly, text regions in the image are first identified. Because the text regions in a typical image are often not level, a preprocessing step is applied to the image to perform skew correction on the text regions. A number of commercially available software programs are available for finding text regions and performing skew correction on those text regions. However, these software programs are typically optimized for high-resolution document images obtained via scanning, so the programs may not be suitable for all types of image capture devices 130. For example, they may not work well with digital camera images that have lower resolution (e.g., lower DPI) and JPEG artifacts, and they also may not work well for detecting text regions with hand written strokes (such as the ones found on whiteboard images).

To identify text regions for such low-resolution images, in one embodiment, the image is first resampled to a resolution of 960×720. Using the well-known Canny edge detector (or any other suitable algorithm), strong horizontal edges are then found in the image. These edges are smeared with a 64×2 pyramid smearing filter, and the text-like regions are found by performing thresholding, a morphological closing operation, and then connected component analysis. Text-like regions that do not conform certain height and width ratio are filtered out. Any number of known algorithms can be used to identify text regions in the image, for example as described in R. Lienhart and A. Wernicke, "Localizing and Segmenting Text in Images, Videos and Web Pages," IEEE Transactions on CSVT, p. 256-268 (2002).

Figure 2A:
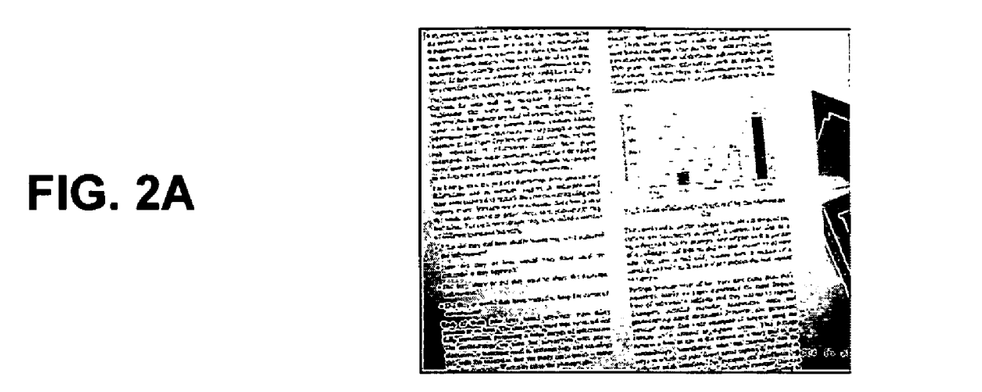
FIGS. 2A through 2C illustrate a process of text detection and skew correction performed on a received image, in accordance with an embodiment of the invention.
Figure 2B:
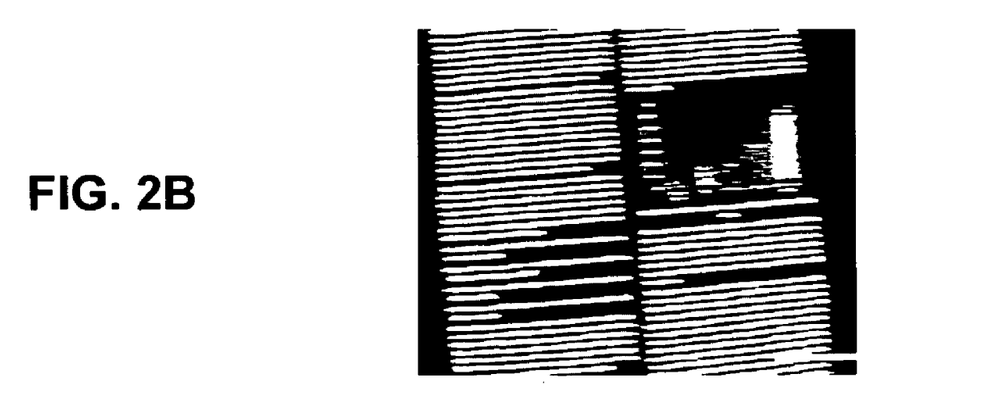
Figure 2C:
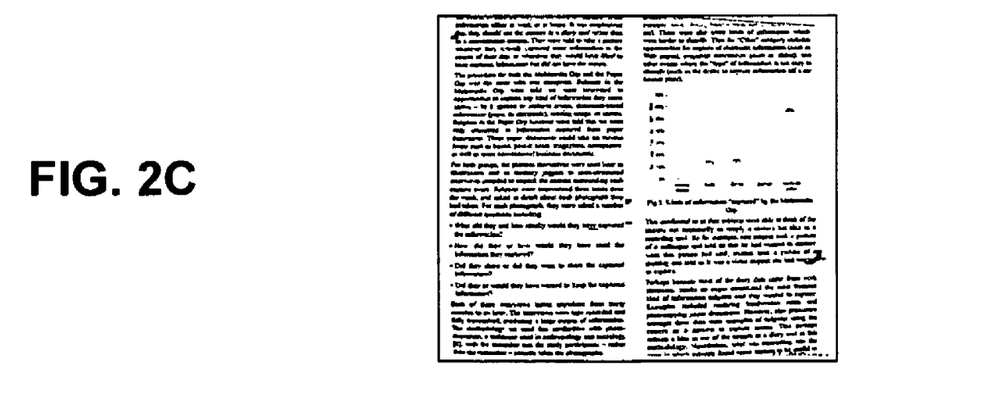

To perform skew correction on the text-like regions, lines in the direction of spread are then fitted to each text region, and a histogram of the tangent of the lines is computed. The histogram is filtered with a 5-tab smoothing filter, and the histogram bin with the maximum value is selected to be the skew angle. The text regions are rotated and binarized based on this computed skew angle, for example using Otsu's method on 32×32 blocks. (See N. Otsu, "A threshold selection method from gray-level histograms," IEEE Transactions on Systems, Man and Cybernetics, p. 62-66, 1979.) FIGS. 2A through 2C illustrate this process of text detection and skew correction, with FIG. 2A illustrating a received image, FIG. 2B illustrating detected text regions in the image, and FIG. 2C illustrating the text regions detected in the image corrected and binarized according to the determined skew angle.

With the text regions identified, a text confidence score is computed for the image as follows:

$$tc = \sum_{r=1}^{R} \frac{T^r_{width}}{T^r_{height}},$$

where R is the number of text regions in the image, $T^r_{width}$ is the width, and $T^r_{height}$ is the height of text region r, respectively.

The text regions are scanned using an optical character recognition (OCR) algorithm to extract the textual content in the regions. Commercial OCR packages are widely available, such as Transym OCR available from Transym Computer Services Ltd. Based on the OCR output, the following features may be computed:

$N_{words}$: Number of words that have more than three characters. This feature may be useful to separate document images from regular images.

$P_{capital}$: The ratio of words starting with capital letters to the number of words. This feature may be useful to separate business card images from document and whiteboard images.

$P_{numerical}$: The ratio of words starting with numerical characters to the number of words. Business card images contain many words with numerical characters, such as phone number, fax number, zip codes, and the like. Accordingly, this feature may be useful for identifying business card images.

$B_{ratio}$: The ratio of number of text lines starting with a bullet point to the total number of text lines. Bullet points are usually not recognized explicitly during the OCR process, but most of the time they can be identified as one of the following ASCII characters: {*, -, ., o}. If $B_{ratio}$ has a high value, the image is likely to be a slide image.

Although the features described above are useful for particular applications, it is understood that these are merely heuristics and may be modified, deleted, and added to. Depending on the set of semantic categories, user may find different heuristics to be necessary to distinguish images among the various categories. Accordingly, these features are provided for illustration only, and are not intended to limit the scope of the invention.

Features extracted from connected component height histograms may be useful for separating machine print from handwriting, which is in turn useful for differentiating whiteboard images from document images. Connected component height analysis is a well-known tool described, for example, in S. N. Srihari, Y-C. Shin, V. Ramanaprasad, and D-S. Lee, "Name and Address Block Reader System for Tax Form Processing," ICDAR, p. 5-10 (1995). In this analysis, connected component height histograms are generally computed only for connected components (i.e., individual letters or markings) in the regions that are identified as being text regions. In one embodiment, the following features are computed from the connected component height histograms:

$$Y \text{ moments } \mu y_2, \mu y_3, \text{ and } \mu y_4, \text{ computed by } \mu y_n = \sum_y (y - \bar{y})^n$$

$$X \text{ spread}, XS, \text{ computed by } XS = \sum_x (x - \bar{x})h(x),$$

where $h(x)$ is the histogram value at $x$

When these computed features indicate groupings of markings having a uniform height (e.g., peaks in the histogram), the text is likely to be machine print. When there is a greater spread of heights of the markings shown in the histogram, the text is likely handwriting. Accordingly, handwritten regions usually have a larger XS and smaller $\mu y_2, \mu y_3$, and $\mu y_4$ than the machine print regions.

Because letters are connected in handwriting more so than that of machine print, the average height to width ratio of connected components in a handwriting text region is typically much smaller than that of the machine print. Based on this, The following are computed:

$$c_{av} = \frac{1}{N} \sum_{i=1}^{N} c_i \text{ and } c_i = \frac{h_i}{nc_i w_i},$$

where N is the number of text boxes, $h_i$ is the height, $w_i$ is the width, and $nc_i$ is the number of connected components (corresponding to letters) in text box i, respectively. Whiteboard images typically have a low connected component height to width ratio, $c_{av}$, whereas document, slide, and business card images have a high ratio.

Some whiteboard images may contain very few foreground strokes, and it can be difficult to differentiate such whiteboard images from regular images (i.e., photographs) based purely on text region features. However, unlike regular images, whiteboard images usually contain a large, relatively uniform background that has a light color. By detecting such a large light background region in an image, therefore, whiteboard images can be differentiated from regular images. In one embodiment, two color features are computed to highlight these properties. An 8-bin luminance histogram of the image is computed. The index of the dominant luminance pairs is computed by:

$$I_d = \text{Index}\left(\max_{h_i \in HIST} \{h_{i-1} + h_i\}\right),$$

where $h_i$, is the value of the $i^{th}$ histogram bin. The dominant luminance is used instead of the dominant color as a feature to represent accurately the cases in which the dominant value is divided somewhat equally between two neighboring bins. The percentage of the dominant luminance value pair is then computed by:

$$P_d = \frac{\max_{h_i \in HIST} \{h_{i-1} + h_i\}}{\sum_i h_i}.$$

These two features, $I_d$ and $P_d$, are thus useful to differentiate whiteboard images from regular images.

Once these features are computed, they are placed in a feature vector, F, which is composed of the ten features described above:

$$F = (tc, N_{words}, P_{capital}, P_{numerical}, \mu y_2, \mu y_3, \mu y_4, XS, I_d, P_d).$$

Because each of the semantic categories can be differentiated from the other categories using one or more of these features, this entire set of features computed for the image can be used to determine the particular semantic category to which the image belongs.

In one embodiment, an image's feature vector is matched to a particular semantic category using a Support Vector Machine (SVM) classifier. SVM is a known technique to implement a binary classifier, and SVM classifiers such as SVM Light are commercially available. SVM is a useful algorithm for matching feature vectors in this context because it offers excellent classification performance in many different domains. In one embodiment, SVM is implemented in a hierarchical fashion to obtain a multi-class classifier. That is, first the image is tested to determine whether it is a regular image. If not, the image is then tested to determine whether it is a business card image, and so on. In one embodiment, the image is tested in the following order: regular, business card, slide, document, and then whiteboard. The kernel function in SVM plays the role of mapping the feature vector to higher dimension space, where an optimal separating hyperplane can be found that classifies two classes by the minimal expected test error. The kernel function employed in one embodiment is a radial basis function, useful because it offers better performance than the polynomial and linear kernel functions.

Figure 3A:
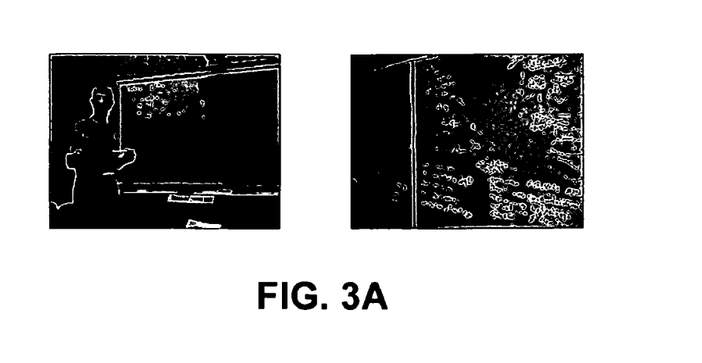
FIGS. 3A through 3D illustrate example whiteboard images, document images, business card images, and regular images, respectively.
Figure 3B:
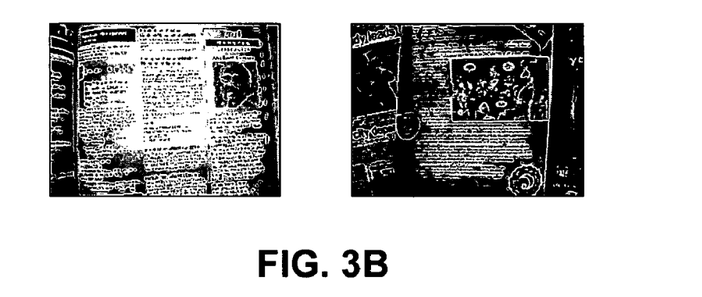
Figure 3C:
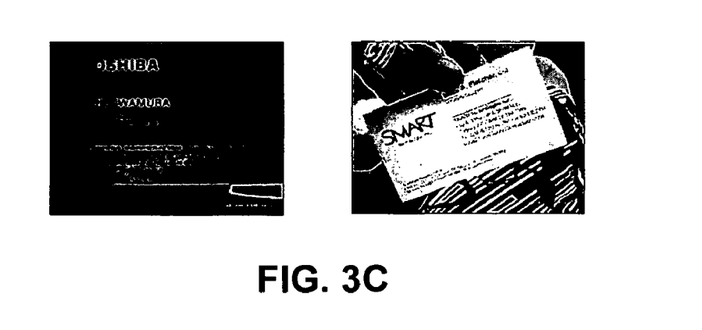
Figure 3D:
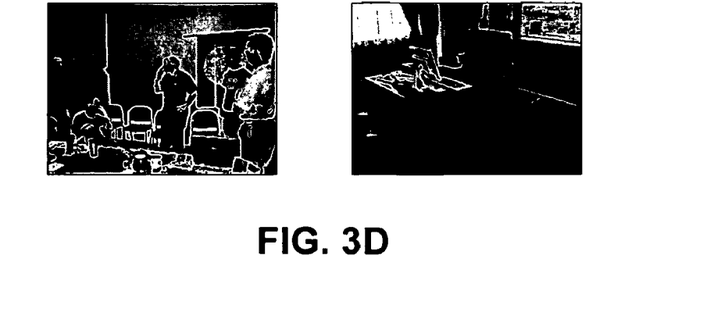

In one experimental test, a database of images contained 58 whiteboard images (e.g., as shown in FIG. 3A), 88 document images (e.g., as shown in FIG. 3B), 115 business card images (e.g., as shown in FIG. 3C), and 103 regular images (e.g., as shown in FIG. 3D). Most of the images in the database were captured by a Ricoh CAPLIO® digital camera. The classifiers were trained using 20 random images from each class, and the classification results are presented in the table below. As shown, the system was able to classify 85% of the images with a 93% accuracy.

| Office Image Class | Number of Images in the Database | Precision | Recall |
| --- | --- | --- | --- |
| Document | 88 | 98% | 79% |
| Business Card | 115 | 93% | 90% |
| Whiteboard | 58 | 81% | 75% |
| Regular | 103 | 99% | 97% |
| TOTAL | 364 | 93% | 85% |

Enhancement Processing

An enhancement processing algorithm is applied to the classified images to improve the quality of the printed image. Which enhancement processing algorithm is applied to the image depends on the type of the image as indicated by its semantic classification. Because the enhancement depends on the classification of the image, the enhancement can be specially tailored for each image, leading to improved overall quality. Moreover, different print options such as paper source, ink selection, and layout orientation can be pre-selected based on the image classification, leading to an improved user expenence.

If the image is determined to be just a regular image (e.g., a digital photograph of a scene), special category-specific processing may not be necessary. But when the image is determined to be of a special type—such as a whiteboard, document, business card, or slide—the system may perform enhancement processing based on the determined image category. Of course, basic image processing may still be performed independent of the image type. For example, in addition to any classification-specific enhancement processing, the printing system may also apply scaling, contrast adjustment, watermarks, and other common image enhancements.

Whiteboard Image Processing

An image of a whiteboard typically contains a lot of excess information beyond the contents of the whiteboard. This excess information includes regions on the image outside the whiteboard as well as the color of the whiteboard itself. In one embodiment, enhancement processing of a whiteboard image is designed to make the background of the whiteboard white, reduce images outside the border of the whiteboards, and increase the contrast of the handwritten strokes that are printed on the whiteboard to improve their readability. Several methods can be used to achieve varying results.

In one embodiment, the contrast of the image was enhanced using the assumption that the background of the whiteboard is white. This assumption may not always lead to good results, however, because: (1) when the white balance settings in a digital camera are not set correctly, the captured whiteboard image may have variety of background colors besides white, such as red or dark blue; and (2) the illumination of the whiteboard is usually not uniform, and the flash reflecting on the whiteboard (usually significantly brighter than the rest of the whiteboard) significantly reduces the contrast enhancement accuracy. In another embodiment, the whiteboard image is binarized while the colors of the foreground strokes are preserved. This method also does not always work well. For whiteboard images that are compressed by a digital camera using JPEG compression, foreground strokes suffer from ringing and chroma bleeding artifacts caused by the fact that some high frequency data is omitted during compression. When binarization is directly performed on the images with JPEG artifacts, bright rings around the text lines cause the binarized text lines to be very thin. As a result, printed whiteboard images are less readable.

Another embodiment for whiteboard enhancement is based on background segmentation, background subtraction, and color enhancement. Background estimation can be performed for an image by first computing the maximum luminance value, $\max_G$, and the minimum, $\min_G$, luminance value. The image is then divided into 32×32 blocks. For each block, the local luminance minimum, $\min_L$, local luminance maximum, $\max_L$, local luminance variance, $\sigma_1^2$, and variance of red, green, and blue values, $\sigma_r^2$, $\sigma_g^2$, and $\sigma_b^2$, are computed. The following conditions are then tested for each block:

$$\sigma_l^2 < (max_G - min_G)/50 \text{ and } (max_L - min_L) < (max_G - min_G)/10,$$

$$\sigma_r^2 < (max_G - min_G)/50 \text{ and } \sigma_g^2 < (max_G - min_G)/50 \text{ and } \sigma_b^2 < (max_G - min_G)/50$$

If the conditions are met, the block is determined to be a background block.

Figure 4A:
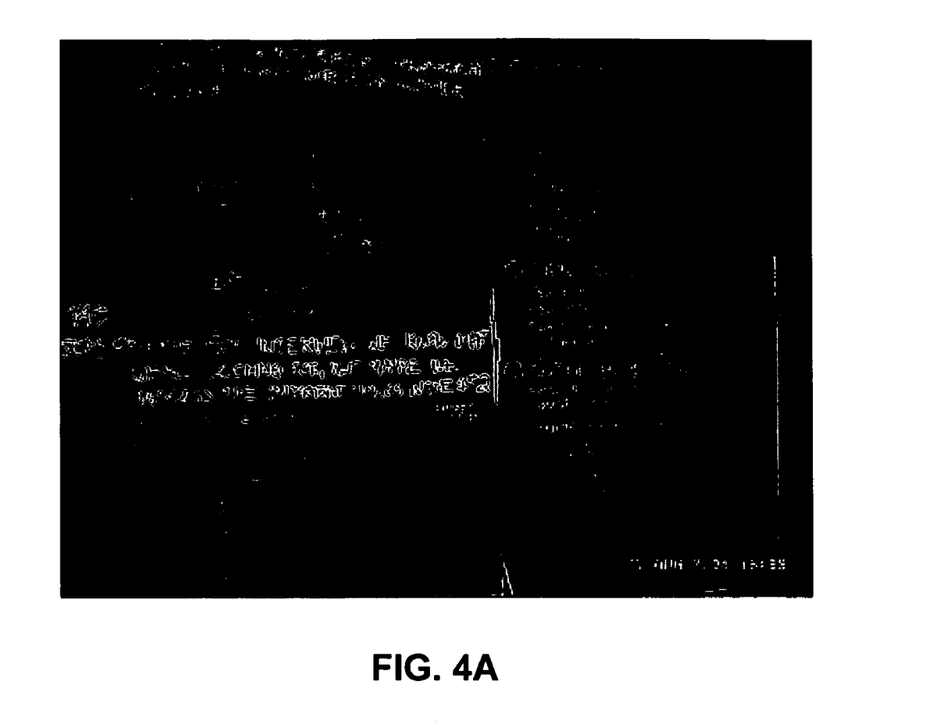
FIGS. 4A through 4D show the enhancement processing steps of an example whiteboard image, in accordance with an embodiment of the invention.
Figure 4B:
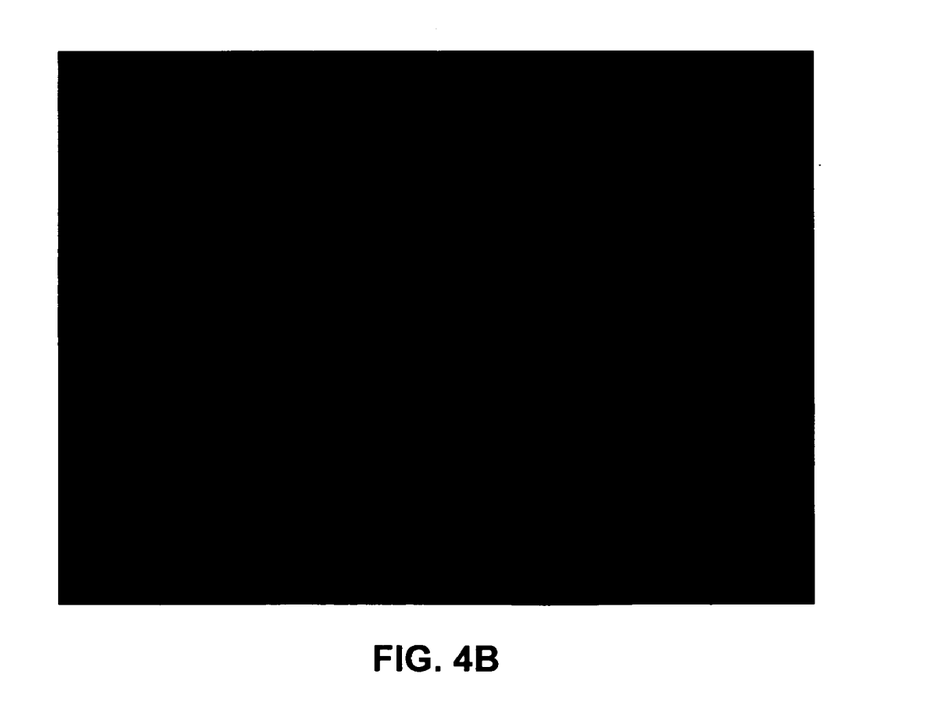

If the conditions are not met, a Fisher discriminant analysis is performed for the block. The analysis is performed both on luminance and saturation values of the pixels separately to classify foreground and background pixels. Discriminant analysis on luminance samples results in two classes with the mean values $ml_1$ and $ml_2$, and the analysis of chrominance samples results in two classes with the mean values $ms_1$ and $ms_2$. When the foreground strokes are in black, then generally classification using the luminance samples results in a better background/foreground separation. When the foreground strokes are in light colors, such as light red or yellow, then classification of the pixels using the chroma values results in a better background/foreground separation. The degree of separation can be determined by how far apart the mean values of the two classes are, i.e. $ms_1 - ms_2$. If the separation in luminance samples is higher, the average color of the pixels belonging to the class with higher luminance mean value is selected as the background color for that block. This is motivated by the fact that background is likely to have lighter color than the foreground strokes where the foreground strokes are in black. If the separation in chrominance samples is higher, the average color of the pixels belonging to the class with lower saturation values is selected as the background color. This is motivated by the fact that a whiteboard background is likely to have lower color saturation than the foreground strokes, where the foreground strokes are in color. After background pixels are determined, a 5×5 smoothing filter is applied to the background image. FIG. 4B illustrates a background computed for an example captured whiteboard image of FIG. 4A.

Figure 4C:
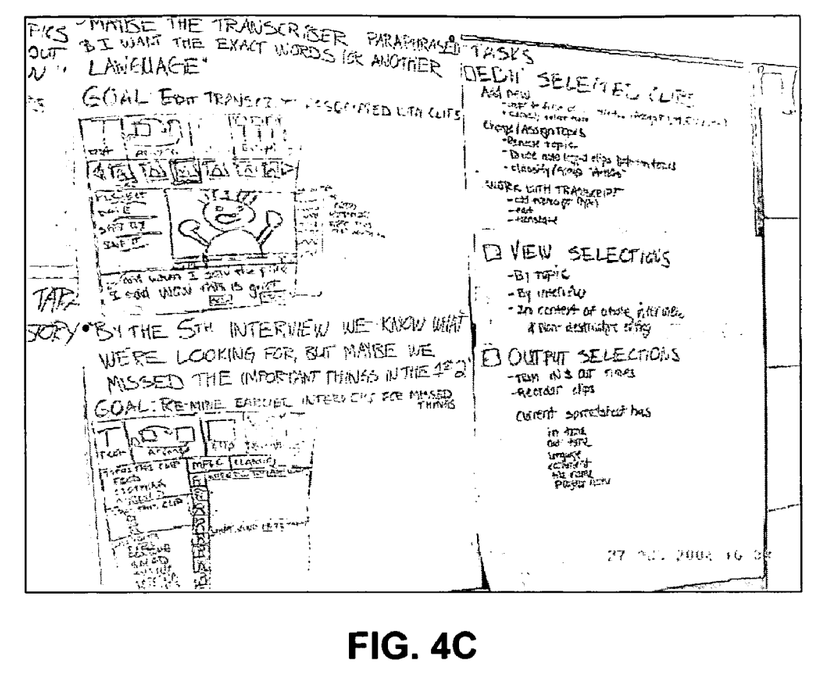
Figure 4D:
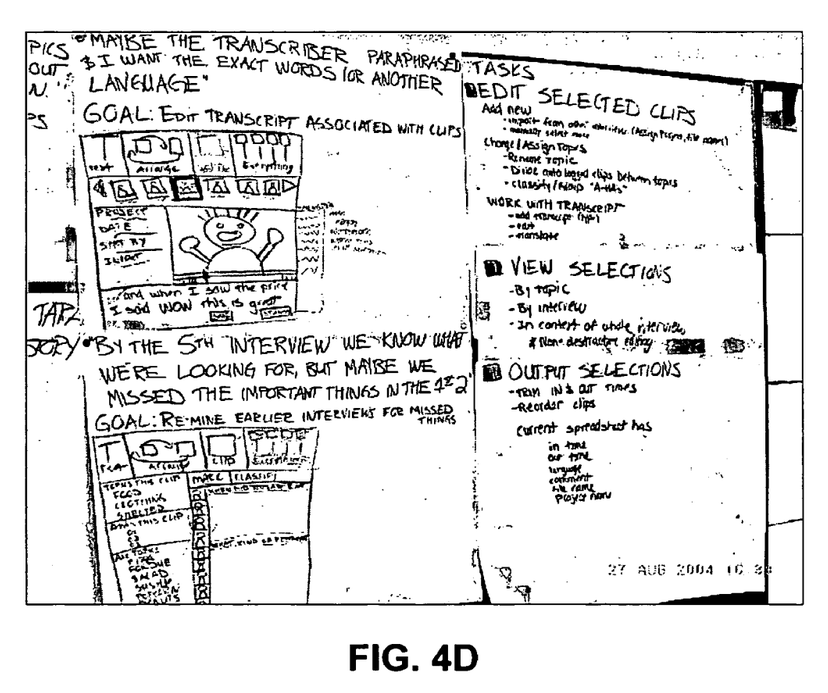
Figure 5A:
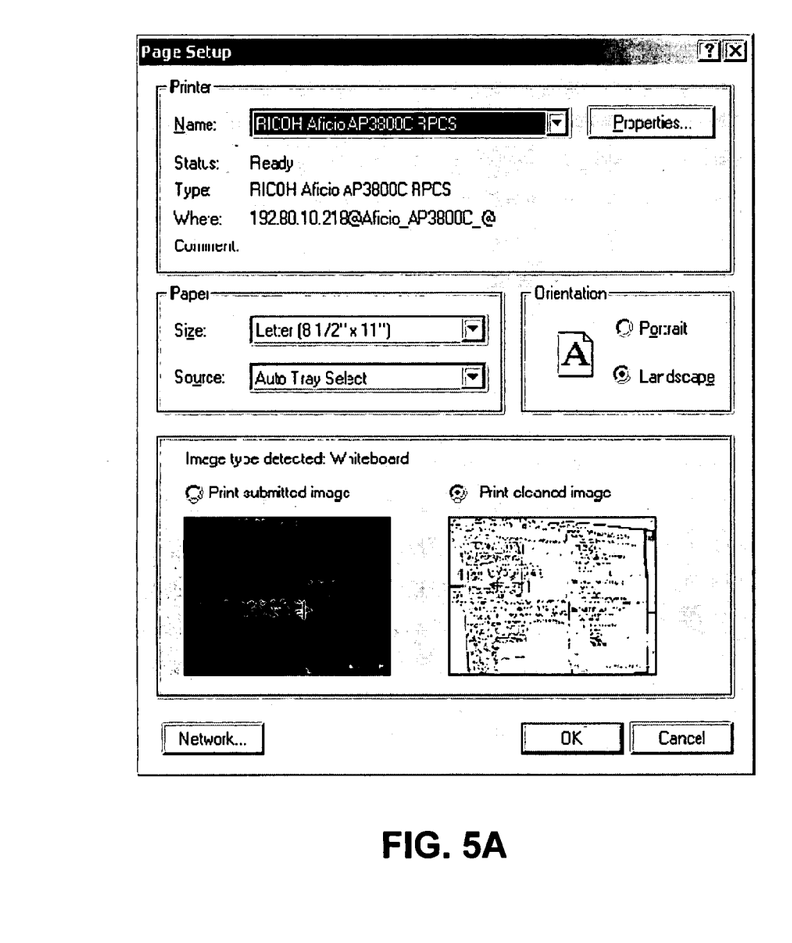
FIGS. 5A through 5D illustrate example dialog boxes in which a user can confirm the system's classification and enhancement processing of a whiteboard image, a document image, a business card image, or a regular image, respectively, in accordance with an embodiment of the invention.
Figure 5B:
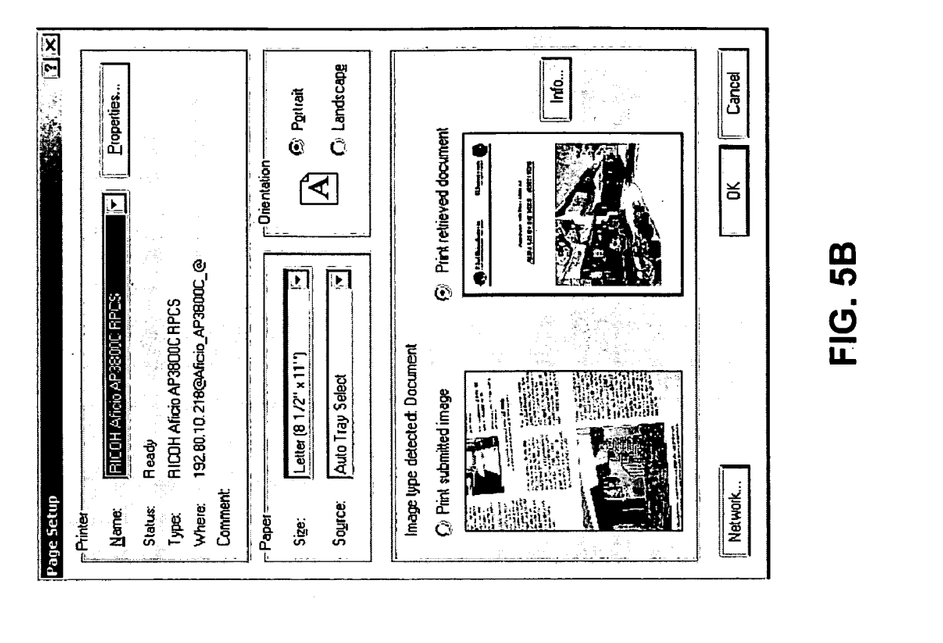
Figure 5C:
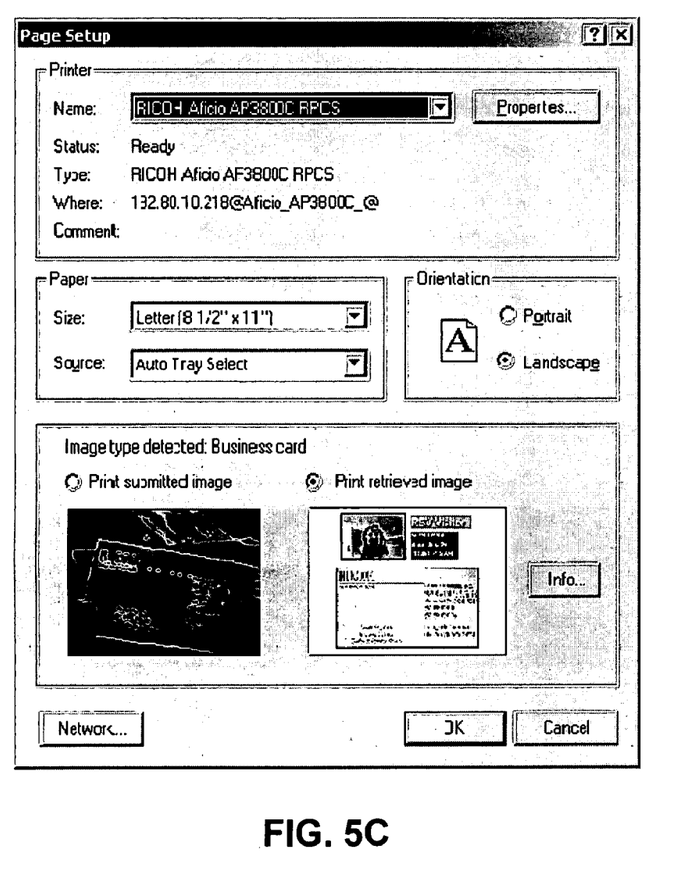
Figure 5D:
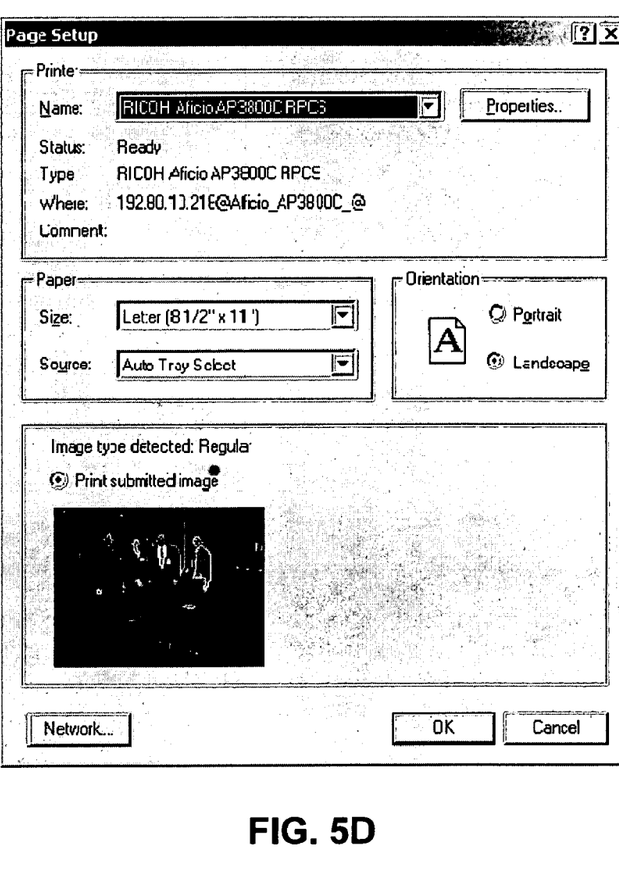

Once the background for the whiteboard image has been estimated, the background is subtracted from the original image to obtain a foreground image. FIG. 4C illustrates a foreground image for the whiteboard image of FIG. 4A after the background of FIG. 4B was subtracted therefrom. After the subtraction, very light colored pixels are filtered out to eliminate noise, and the pixel values in the resulting foreground image are normalized to 1. The foreground image is then enhanced by a S-shaped curve fitting of the colors, where the enhanced color components (R', G', and B') are computed by $$R' = \frac{1}{1 + e^{6 \times (0.6 - R)}},$$

for red, and similarly for the green and blue components. FIG. 4D illustrates the enhanced foreground image.

In another embodiment, additional information about the whiteboard image can be added to the enhanced image. For example, a URL or a barcode image encoding a URL or other link can be appended. This URL or other link may be a link to the audio/video of the meeting in which the whiteboard image was created. The appended information could also include a listing of the attendees at the meeting, the business cards of the attendees, the slides presented at the meeting, or any other information relevant to the whiteboard image.

Document Image Processing

As an alternative to modifying an image to improve its readability, the enhancement processing module 115 may retrieve another version of a matching document. As shown in FIG. 1, the enhancement processing module 115 is coupled to an image database 140, which may contain documents, slides, business cards, and other related information. The database 140 may include a document database such as E-cabinet or Document Mall. Presumably, a version of an image in the image database 140 is of a better quality than the corresponding image captured by the image capture device. For example, if someone takes a digital photograph of the front page of a document, the original electronic version of the document would be a better representation of the document than the photograph. Moreover, the retrieved version could include the entire document, not just a single page thereof.

In one embodiment, when a captured image is identified as a document image, the enhancement processing module 115 attempts to match the document image with a document in the image database 140. A great many methods exist for document image matching. One suitable method is based on n-gram word matching, where n-grams (where n=1 and n=2) of the text extracted from the captured image is matched against to those of the database 140. (See, e.g., Berna Erol, Jonathan J. Hull, Jamey Graham, and Dar-Shyang Lee, "Prescient Paper: Multimedia Document Creation with Document Image Matching," IEEE ICPR Conference, 2004.) When a matching document with a high confidence score is found, that document is retrieved and replaces the originally captured image. If a matching document is not found in the database 140, the enhancement processing module 115 may attempt to retrieve the original document from a public source, such as the Internet using a search engine. If no original document can be matched to the image, the captured image may just be enhanced to increase its contrast and isolate and skew correct its text, using a method as described above with respect to whiteboard image enhancing.

As with whiteboard images, additional information about a document image can be printed on paper along with the image. If the image is a document image, the appended information may include a URL or other link to the document's electronic version in a document versioning system, or it may include bibliographical information about the document.

Business Card Image Processing

If the image has been determined to be a business card image, the enhancement processing module 115 may adjust the contrast and perform text identification and skew correction as described for whiteboard images. Alternatively, the enhancement processing module 115 may search for a scanned version of the business card and any associated contact or personal identification. Business card scanners are commonly used in the workplace, and some appliances keep a database of business cards that are scanned in by the visitors (such as the "Visotor's Kiosk" described in U.S. application Ser. No. 09/714,785, filed Nov. 15, 2000, which is incorporated by reference in its entirety). If a captured image is classified as a business card image and the database 140 includes business card information, the enhancement processing module 115 may query the database 140 to obtained scanned version of the business card image. If a matched business card is found, that version is substituted for the captured business card image. Moreover, the enhanced business card image may also include appended information about the person identified in the business card, such as a link to the web page of the person, a photograph of the person, and the dates that person visited the company.

Slide Image Processing

If the image has been determined to be a slide image, the enhancement processing module 115 may adjust the contrast and perform text identification and skew correction as described for whiteboard images. However, meeting and presentation recorders are becoming more common. If the database 140 includes such information for presentations, the captured slide image can be used to identify the presentation in which the slides were shown. In this way, the enhancement processing module 115 can retrieve either the original presentation slides or the recorded presentation slides. Techniques for identifying a presentation from a captured slide are known, as described for example in Berna Erol, Dar-Shyang Lee, and Jonathan J. Hull, "Retrieval of Presentations using Digital Camera Images," IEEE CVPR Conference, 2004, and in Berna Erol, Jonathan J. Hull, and Dar-Shyang Lee, "Linking Multimedia Presentations with their Symbolic Source Documents: Algorithm and Applications," ACM Multimedia Conference, 2003. If a better version of the slide image is identified, that version is used to replace the captured slide image.

In addition, information about a slide image can be appended to the enhanced slide image. If the image is a slide image, the appended information may include a URL or other link to the corresponding presentation on an intranet, a listing of the attendees at the meeting, the business cards of the attendees, or any other information relevant to the meeting in which the slides were presented.

Printer Interface

The printing system 100 preferably includes a user interface that presents the result of the automatic image classification to the user, allowing the user to accept the classification result or change it to another image type. The user interface may be integrated in a printer, in a computing device coupled to the printer, or in the image capture device 130. The user interface may thus comprise a display system, software for communicating with an attached display, or any number of embodiments described in co co-pending U.S. application Ser. No. 10/814,700, filed Mar. 30, 2004; co-pending U.S. application Ser. No. 10/814,500, filed Mar. 30, 2004; and co-pending U.S. application Ser. No. 10/814,845, filed Mar. 30, 2004; each of which is incorporated by reference in its entirety. In one embodiment, if the user does not interact with the interface for a predetermined time period, the proceeds with the enhancement processing and/or printing based on the automatically identified image type. FIGS. 5A through 5D illustrate example dialog boxes in which a user can confirm the system's classification and enhancement processing of a whiteboard image, a document image, a business card image, or a regular image, respectively. In addition to confirming the output of the classification result, the dialog box can allow the user to specify the semantic image class and/or the post processing steps manually.

As a result of the semantic classification, printer can automatically select the paper feed and ink to use. For example, if the image to be printed is classified as a regular photo, then the printer should use high quality photo paper and ink to print the image. In the contrary, if the image is classified as a whiteboard image, the printer can use a low quality letter size paper and low quality (e.g., black and white) ink or toner for printing. Similarly, if the image to be printed is identified as a document image and the original document is being printed, the printer can print the document as double sided. Accordingly, the printer interface may guide the user to place the proper paper to the paper-feed depending on the image content. For example, if image is detected as a regular image, the user can be guided to place a photo paper to the paper-feed. Similarly, if the image detected is a color presentation, the user can be directed to install the proper ink or toner cartage in the printer.

The layout of the document may also depend on the image classification result. For example, if the image type is whiteboard, the image can be printed such that the text parts of the whiteboard image are enlarged, eliminating the large white space that is usually present in whiteboard images and making the content of the whiteboard image more readable. Similarly, the layout of the text portions can be changed to make the text regions more readable.

User preferences can be established for one or more of the image classification types, providing default printer settings (e.g., paper source, layout, and the like) for each or a subset of the image types. These settings can be stored by the printing system 100, the portable image capture device 130 (e.g., on the digital camera or cellular phone), or on a shared preferences server. If stored on the printing system 100, the preferences can be indexed by a unique identifier, such as a phone number. The default preferences can be applied in a way that is completely automatic or partially automatic, such as by asking the user for confirmation.

In one embodiment, instead of directly printing an enhanced image, the image is delivered to one or more users, who can then print the document at will. The delivery can be automatic based on an image's classification. For example, if image is classified as a slide image, the output system 120 can send an electronic output 155 containing the full set of slides to the known participants of the meeting. The output system 120 could also send business cards and whiteboard images that are associated with the meeting.

General Comments

While examples of suitable printing systems are described above, the description of the printing system and its image classification and processing functionalities is not meant to be limiting. Depending on the intended application, a printing system can take many different forms other than the typical office or home-use printer, with which most people are familiar. Therefore, it should be understood that the definition of a printer or printing system encompasses any device or devices capable of producing an image, words, or any other markings on a surface or other tangible medium. Although printing on paper is discussed above, it should be understood that a printer in accordance with various embodiments of the present invention could produce an image, words, or other markings onto a variety of tangible media, such as transparency sheets for overhead projectors, film, slides, canvass, glass, stickers, or any other medium that accepts such markings.

Moreover, any of the steps, operations, or processes described herein can be performed or implemented with one or more software modules or hardware modules, alone or in combination with other devices. It should further be understood that portions of the printer described in terms of hardware elements may be implemented with software, and that software elements may be implemented with hardware, such as hard-coded into a dedicated circuit. In one embodiment, a software module is implemented with a computer program product comprising a computer-readable medium containing computer program code, which can be executed by a computer processor for performing the steps, operations, or processes described herein. The software module may be executed on a computer system coupled to a printer, or it may be integrated within a printer driver that controls the printer. Alternatively, the functionalities described herein, regardless of their implementation, may be embedded within a printer.

In alternative embodiments, the printing system can use multiple application servers, for example acting in cooperation. Any of the requests or messages sent or received by the printer can be sent across a network, using local cables such as IEEE 1394, Universal Serial Bus, using wireless networks such as IEEE 802.11 or IEEE 802.15 networks, or in any combination of the above or any other known techniques.

The processing steps and other functions described herein may be performed entirely on a printing system by hardware, software, firmware, or a combination thereof embedded in the system. In other embodiments, some or all of the steps can be performed off the system, in conjunction with one or more electronic devices capable of performing some or all of the steps and/or functions. Some embodiments of the printing system can thus balance any classification and enhancement processing of received images among the printing system and any number of coupled electronic devices, such as a source device (e.g., a digital camera or cellular phone with picture capability), a personal computer, or an external network service. By conducting at least some of the processing on the printing system, the system can relieve some of the processing load on the external electronic devices that would otherwise carry this processing load.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

What is claimed is:

1. A system for organizing images captured in an environment, the system comprising:
    an interface for receiving an image from an image capture device;
    a semantic classifier module coupled to the interface, the semantic classifier module configured to determine a semantic category for the image, at least in part, by comparing heights of a plurality of markings on the image to determine whether the image belongs to a semantic category typically comprising machine-generated text or a semantic category typically comprising handwriting; and
    an enhancement processing module coupled to the semantic classifier module, the enhancement processing module configured to enhance the image based on the semantic category into which the image was classified.

2. The system of claim 1, further comprising:
    an output system coupled to receive the enhanced image from the enhancement processing module and prepare the enhanced image for printing.

3. The system of claim 1, wherein the semantic categories include at least whiteboard images, business card images, document images, slide images, and regular images.

4. The system of claim 1, wherein the semantic classifier module determines the semantic category for the image, at least in part, by:
    extracting a plurality of features from the image;
    combining the extracted features into a feature vector; and
    comparing the feature vector with information in a trained database to determine the semantic category for the image.

5. The system of claim 1, wherein the enhancement processing module enhances the image, at least in part, by performing at least one of: scaling, cropping, foreground subtraction, background subtraction, contrast adjustment, and text rotation.

6. The system of claim 1, wherein the enhancement processing module enhances the image, at least in part, by appending information to the image to enhance the image.

7. The system of claim 1, wherein the image is a whiteboard image, and the enhancement processing module computes a background of the image and subtracts the background from the image to enhance textual content in the image.

8. The system of claim 1, further comprising:
    an output system configured to select a layout orientation for a printed output of the image based on the semantic category into which the image was classified.

9. The system of claim 1, further comprising:
    an output system configured to select a paper source and/or ink selection for a printed output of the image based on the semantic category into which the image was classified.

10. The system of claim 1, further comprising:
    an output system coupled to receive the enhanced image from the enhancement processing module and prepare the enhanced image for printing, at least in part, by:
        retrieving a set of default printing preferences associated with the semantic category into which the image was classified; and
        applying the set of default printing preferences to generate a printed output of the image.

11. The system of claim 1, wherein the captured image is received from a digital camera.

12. The system of claim 1, further comprising:
    an output system configured to generate a printed output of the enhanced image.

13. The system of claim 1, further comprising:
    an output system configured to deliver the enhanced image to one or more users, the delivered enhanced image capable of being printed.

14. A computer-implemented method for organizing images captured in an environment, the method comprising:
    receiving, with a processor, a captured image;
    classifying, with the processor, the image into a semantic category, at least in part, by comparing heights of a plurality of markings on the image to determine whether the image belongs to a semantic category typically comprising machine-generated text or a semantic category typically comprising handwriting; and
    enhancing, with the processor, the image based on the semantic category into which the image was classified.

15. The method of claim 14, further comprising:
    preparing the enhanced image for printing.

16. The method of claim 14, wherein the semantic categories include at least whiteboard images, business card images, document images, slide images, and regular images.

17. The method of claim 14, wherein the classifying comprises:
    extracting a plurality of features from the image;
    combining the extracted features into a feature vector; and
    comparing the feature vector with information in a trained database to determine the semantic category for the image.

18. A computer-implemented method for printing an image captured from an image capture device, the method comprising:
    classifying, with a processor, the image into a semantic category, at least in part, by comparing heights of a plurality of markings on the image to determine whether the image belongs to a semantic category typically comprising machine-generated text or a semantic category typically comprising handwriting;
    enhancing, with the processor, the image based on the semantic category of the image; and
    printing, with the processor, the enhanced image.

* * * * *